Patented Feb. 10, 1925.

1,526,034

UNITED STATES PATENT OFFICE.

HERMANN WIELAND, OF KONIGSBERG, GERMANY, ASSIGNOR TO THE FIRM OF C. H. BOEHRINGER SOHN, CHEMISCHE FABRIK, OF NIEDER-INGELHEIM-ON-THE-RHINE, GERMANY, A SOCIETY OF GERMANY.

NARCOTIC.

No Drawing.   Application filed March 22, 1923.   Serial No. 626,974.

*To all whom it may concern:*

Be it known that I, HERMANN WIELAND, a citizen of Germany, residing at Konigsberg, Prussia, Germany, have invented certain new and useful Improvements in Narcotics, of which the following is a specification.

This invention broadly refers to anæsthetics or narcotics, and it is particularly intended to devise means of utilizing the otherwise well known narcotic properties of acetylene and similar agents for the production of anæsthesia by inhalation without any injurious or noxious effects upon the patients, and my invention further contemplates the avoiding of the bad after effects accompanying the action of anæsthetics of this kind, and to render such agents readily acceptable to the human system, and in view thereof my invention further provides means of overcoming the usual reflectory nervous resistance of the system opposed against the action of such agents through the respiratory organs, and which otherwise considerably delays and prolongs the application of substances of the kind referred to. Acetylene, though its narcotic properties are well known, could not be used heretofore for anæsthetic purposes in view of the fact that it has been impossible heretofore to entirely overcome the deleterious effects of the poisonous impurities contained in gaseous acetylene, and which are liable to produce fatal accidents as has been shown by experiments made with rabbits, guinea pigs, cats and other small animals. Inasmuch as even minute fractions of such impurities, mostly consisting of phosphorus compounds have been found to become fatal it is of importance to provide means for the removal of even the least amount of such impurities. It is well known that these objectionable compounds cannot be eliminated by the usual methods of purification of commercial acetylene. Nor has it been possible to produce the desired complete purification by the treatment of acetylene with the well known chromic acid compound, sometimes designated by the trade name heratol, and consisting of a solution of chromic acid or bichromate of potash in sulphuric acid, and containing about eleven (11) per cent of chromic acid, and absorbed in porous solid material, such as infusorial earth, kieselguhr, pumice stone and the like. This compound has been suggested for the purification of acetylene, its action being probably due to the oxidation of the phosphorus and other hydrides, and of other impurities contained in crude acetylene gas; and on an average an amount of about one kilogram of heratol has been found sufficient for the purification of five cube meters (176½ cube feet) of acetylene gas. This treatment however, has been found insufficient for the removal of the minute quantities of poisonous impurities, and it has been ascertained that it is necessary to continue the purification process, until physiological tests with small animals, such as mice, fail to produce any poisonous or other injurious effects after inhalation for say from four to five hours. Inasmuch as chemical tests are not sufficiently sharp for indicating the presence of the impurities referred to, the treatment with the chromic acid mixture or with other purifying agents has to be repeated or continued until the gas fails to toxically react by physiological tests. By way of example it has been ascertained that an amount of 3 kilograms of the chromic acid mixture or a correspondingly increased amount of other purifying agents will be required to produce the desired toxically negative mixture. In connection therewith it has been ascertained that certain animals, such as mice for instance, are capable of supporting perfectly pure acetylene for a much longer time than human being, though they are much more sensitive than man to the anæsthetics ordinarily employed, such as chloroform or ether. It has been shown that, while it is impossible to test the physiological purity of chloroform on mice by inhalation, because they succumb to the action of the narcotic, before the impurities have any chance to act, mice may be kept in suitable mixtures of absolutely pure acetylene and air, or oxygen, for a comparatively long time in narcosis, for about 4 to 5 hours for example without any injurious influence upon the vital functions, such as respiration and cardial action manifesting itself. On the other hand, if but slight amounts of the apparently phosphor-containing impurities of the second group, that is to say the impurities escaping purification by the ordinary methods, are present the mice are very soon showing symptoms of poisoning manifesting themselves by diminished respiration, convulsions, and finally death. If these toxic symptoms are absent the purification of the acetylene for anæsthetic purposes has been accomplished.

Acetylene when purified in accordance with this invention to the absence of the impurities referred to constitutes an anæsthetic of excellent narcotic properties, and which is entirely free from any fatal or injurious effects upon the human system, and which, moreover, as compared with other known anæsthetics presents the advantage that the patient very readily submits to the narcotic action, while at the termination thereof he quickly regains consciousness. The new agent is free from any deleterious effects upon the health of the patient, and does not produce objectionable after-effects, such as vomiting or the like.

The concentration required to produce the narcotic effect is not very high. On an average about 50 per cent of acetylene in the gaseous mixture to be inhaled is sufficient. Even with much higher concentrations no injurious actions on the human system have been observed, the concentrations rising to about 70 to 80%.

The acetylene employed may be charged with other narcotics, preferably for instance, the vapors of ether, chloroform, nitrous oxide or equivalent means. A narcotic effect is thereby produced in excess of the combined action of the components, inasmuch as in these mixtures only very small amounts of the additional anæsthetic have been found sufficient for obtaining loss of consciousness; thus, for example, only about a tenth of the amount of ether ordinarily employed, so as to effectually dispense with the objectionable results of the administration of the usual narcotics, such as ether, chloroform, nitrous oxide and the like. As an example of carrying the invention into effect I may mention a mixture of about 40 to 50% acetylene, approximately 60 to 50% oxygen and from 5 to 10 drops of ether corresponding to about 1.5% of ether vapor, as a suitable anæsthetic mixture.

Obviously acetylene does not act upon all persons in the same manner. Cases have been noticed in which a certain reflectory resistance is opposed on the side of the patients to the inhalation of the anæsthetic which considerably interferes with the administration thereof, particularly in the early stages. It has been ascertained by experiments that this drawback may be overcome by adding a suitable amount of more or less odorous substances to the acetylene. The favorable action of this addition is probably due to a diversion of the nervous system which eliminates the reflectory resistance of the patient, so that the narcotic agent is readily taken by the patient in the initial stages of inhalation.

Among the flavors or odorous substances suitable for the purpose in question cyclic alcohols have been found to be particularly suitable, such as for example geraniol, linalool and their esters, citral or a mixture of these and equivalent substances. Also the addition of the natural flavors and odorous substances obtained from flowers, and containing these and similar odorous principles, may be used with equal advantage.

The addition of the odorous principle may be effected for instance by dissolving a suitable quantity thereof, to the amount of, say 3 to 5 and for instance, in a solvent for acetylene, for example in aceton.

My invention is susceptible of various modifications and alterations without deviating from the principle thereof, in order to better adapt it to varying conditions of application and to the disposition of the patient and to the convenience of the practitioner, and without limiting the invention to the particular language and terms employed in this specification and claims for the purpose of explanation of the principles thereof.

I claim:—

1. A composition of matter for use as an anesthetic comprising acetylene free of phosphorus to such a degree that it does not respond to physiological toxic tests.

2. A composition of matter for use as an anesthetic including in a substantial proportion acetylene free of phosphorus to such a degree that it does not respond to physiological toxic tests.

3. A composition of matter for use as an anesthetic comprising a mixture of acetylene free of phosphorus to such a degree that it does not respond to physiological toxic tests and a gaseous diluent.

4. A composition of matter for use as an anesthetic comprising a mixture of acetylene free of phosphorus to such a degree that it does not respond to physiological toxic tests and oxygen.

5. A composition of matter for use as an anesthetic comprising a mixture of acetylene free of phosphorus to such a degree that it does not respond to physiological toxic tests and an additional anesthetic vapor.

In testimony whereof I affix my signature in presence of two witnesses.

HERMANN WIELAND.

Witnesses:
 RUDOLF SCHOEN,
 GERHARD STIVOKA.